United States Patent
Kwon et al.

(10) Patent No.: US 10,122,785 B2
(45) Date of Patent: *Nov. 6, 2018

(54) METHOD OF SYNCHRONIZING A PLURALITY OF CONTENT DIRECTORY DEVICE (CDS) DEVICES, CDS DEVICE, AND SYSTEM

(71) Applicant: SAMSUNG ELECTRONICS CO., LTD., Suwon-si (KR)

(72) Inventors: Won-seok Kwon, Suwon-si (KR); Joo-yeol Lee, Seoul (KR); Seung-jae Oh, Seoul (KR); Dong-Shin Jung, Suwon-si (KR); Se-Hee Han, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 403 days.

This patent is subject to a terminal disclaimer.

(21) Appl. No.: 14/264,934

(22) Filed: Apr. 29, 2014

(65) Prior Publication Data

US 2014/0237135 A1   Aug. 21, 2014

Related U.S. Application Data

(63) Continuation of application No. 11/704,309, filed on Feb. 9, 2007, now Pat. No. 8,738,806.

(30) Foreign Application Priority Data

Dec. 19, 2006   (KR) .................. 10-2006-0130138

(51) Int. Cl.
*H04L 29/08* (2006.01)
*G06F 17/30* (2006.01)
*H04L 12/28* (2006.01)

(52) U.S. Cl.
CPC ........ *H04L 67/06* (2013.01); *G06F 17/30174* (2013.01); *H04L 12/2809* (2013.01);
(Continued)

(58) Field of Classification Search
CPC combination set(s) only.
See application file for complete search history.

(56) References Cited

U.S. PATENT DOCUMENTS 6,397,125 B1 *   5/2002   Goldring et al. ............. 700/200
6,874,037 B1     3/2005   Abram et al.
(Continued)

FOREIGN PATENT DOCUMENTS

EP   1599812 A0      11/2005
JP   2002-182778 A   6/2002
(Continued)

OTHER PUBLICATIONS

Ritchie J, et al.: "UPnP AV Architecture: 0.83", Design Document Microsoft, ?XX, XX, Jun. 12, 2002 (Jun. 12, 2002), pp. 1-22, XP002271673?
(Continued)

*Primary Examiner* — Abdullahi E Salad
(74) *Attorney, Agent, or Firm* — Sughrue Mion, PLLC (57) ABSTRACT

Provided is a method and system for synchronizing a plurality of content directory service (CDS) devices in a home network environment. The method of synchronizing the plurality of CDS devices of a home network, which includes the plurality of CDS devices and a control point (CP), comprises (a) requesting a first CDS device among the plurality of CDS devices to start synchronization using the CP; (b) performing the synchronization with a second CDS device among the plurality of CDS devices using the first CDS device; (c) selecting a third CDS device from the plurality of CDS devices and requesting the third CDS
(Continued)

device to start synchronization with the first CDS device or the second CDS device using the CP; and (d) performing the synchronization with the first CDS device or the second CDS device using the third CDS device.

3 Claims, 5 Drawing Sheets

Related U.S. Application Data (60) Provisional application No. 60/772,897, filed on Feb. 14, 2006.

(52) U.S. Cl.
CPC ...... *H04L 12/2812* (2013.01); *H04L 67/1095* (2013.01); *H04L 2012/2849* (2013.01)

(56) References Cited

U.S. PATENT DOCUMENTS

| 7,085,814 | B1 | 8/2006 | Gandhi et al. |
| 7,668,939 | B2 | 2/2010 | Encarnacion et al. |
| 2004/0221007 | A1 | 11/2004 | Roe et al. |
| 2005/0021866 | A1* | 1/2005 | Kang et al. ............ 709/248 |
| 2005/0055352 | A1 | 3/2005 | White et al. |
| 2005/0135341 | A1 | 6/2005 | Kim |
| 2006/0041596 | A1 | 2/2006 | Stirbu et al. |
| 2006/0080354 | A1* | 4/2006 | Berger et al. ............ 707/103 R |
| 2006/0168000 | A1 | 7/2006 | Bodlaender |
| 2007/0255854 | A1 | 11/2007 | Khosravy et al. |

FOREIGN PATENT DOCUMENTS

| JP | 2002-373101 A | 12/2002 |
| KR | 20010085803 A | 9/2001 |
| KR | 20030011096 A | 2/2003 |
| KR | 10-2004-0013465 A | 2/2004 |
| WO | 2004/077207 A2 | 9/2004 |
| WO | 20050002139 A1 | 1/2005 |

OTHER PUBLICATIONS

Communication from the European Patent Office dated Feb. 16, 2012 in counterpart European Application No. 07708842.5.
Communication from the Japanese Patent Office dated Mar. 15, 2011 in a counterpart application No. 2008-555142.

* cited by examiner

METHOD OF SYNCHRONIZING A PLURALITY OF CONTENT DIRECTORY DEVICE (CDS) DEVICES, CDS DEVICE, AND SYSTEM

CROSS-REFERENCE TO RELATED APPLICATIONS

This is a continuation of U.S. patent application Ser. No. 11/704,309, which claims priority from Korean Patent Application No. 10-2006-0130138 filed on Dec. 19, 2006 in the Korean Intellectual Property Office and U.S. Provisional Patent Application No. 60/772,897 filed on Feb. 14, 2006 in the United States Patent and Trademark Office, the disclosures of which are incorporated herein by reference in its entirety.

BACKGROUND OF THE INVENTION

1. Field of the Invention

Methods and systems consistent with the present invention relates to home network technology, and more particularly, to synchronizing a plurality of content directory service (CDS) devices in a home network environment.

2. Description of the Related Art

Generally, a home network is formed of an Internet protocol (IP)-based private network. In the home network, various devices used at home, such as all forms of personal computers (PCs), intelligent products, and wireless devices, are connected to a single network through a common virtual computing environment called 'middleware' and controlled accordingly. Middleware connects various digital devices in a peer-to-peer manner and thus enables them to communicate with each other. Related art middleware includes home AV interoperability (HAVI), universal plug and play (UPnP), Java intelligent network infrastructure (Jini), and home wide web (HWW).

In particular, UPnP network is home network technology which is expected to be most widely used in the near future. The UPnP network defines an UPnP device, an UPnP service, and a protocol between the UPnP device and the UPnP service. The UPnP network is composed of controlled devices (CDs) and a control point (CP). The CDs are home network devices, which are connected to an IP-based home network and controlled accordingly, and the CP is a device controlling the CDs. The CP requests an event, and receives the requested event. Each of the CDs performs a predetermined function at the request of the CP. If the state of a CD changes, the CD sends an event to the CP at the request of the CP.

An operational process between devices in the related art UPnP network includes advertisement, discovery, description, control, and eventing processes.

UPnP audio/video (AV) technology, which enables a user to enjoy multimedia content, such as AV content, based on the UPnP technology, is described in an UPnP AV specification. According to the UPnP AV specification, UPnP AV architecture includes a media server providing a multimedia file using a CDS, a media renderer rendering the multimedia file provided by the media server, and a CP controlling the media server and the media renderer to communicate with each other. The CDS is a service built in the media server. The CDS provides metadata of content, which exists inside or outside a home network or is stored in the media server, to the CP. The CP identifies the metadata from the CDS and requests the media renderer to render the metadata.

If a plurality of devices, which form the UPnP AV architecture described above, is used at home, there is a need for a plurality of media servers storing different content. Accordingly, there must be a plurality of CDS's. As such, a method of synchronizing content scattered over a plurality of different CDS's on a home network environment is needed.

SUMMARY OF THE INVENTION

The present invention provides a method and system for synchronizing a plurality of CDS devices, which is capable of synchronizing content respectively retained by the CDS devices.

The present invention also provides a method and system for synchronizing a plurality of CDS devices, which is capable of reducing dependency on a CP after the synchronization of the CDS devices starts, thereby minimizing the time required to synchronize the CDS devices and network traffic due to the synchronization.

According to an aspect of the present invention, there is provided a method of synchronizing a plurality of CDS devices of a home network including the plurality of CDS devices and a CP. The method includes (a) requesting a first CDS device among the plurality of CDS devices to start synchronization using the CP; (b) performing the synchronization with a second CDS device among the plurality of CDS devices using the first CDS device; (c) selecting a third CDS device from the plurality of CDS devices and requesting the third CDS device to start synchronization with the first CDS device or the second CDS device using the CP; and (d) performing the synchronization with the first CDS device or the second CDS device using the third CDS device.

According to another aspect of the present invention, there is provided a CDS device including a synchronization descriptor which comprises synchronization information for synchronization with other CDS device; a synchronization descriptor management unit which manages the synchronization descriptor; and an embedded CP which exchanges the synchronization information with the other CDS device.

According to another aspect of the present invention, there is provided a system including a media server which has a plurality of CDS devices, the media server providing multimedia content; a media renderer which renders the provided multimedia content; and a CP which controls the media server and the media renderer to communicate with each other and supports synchronization of the CDS devices, in which the CP requests a first CDS device among the plurality of CDS devices of a home network to start synchronization, the first CDS device performs the synchronization with a second CDS device among the plurality of CDS devices, and a third CDS device among the plurality of CDS devices performs synchronization with the first CDS device or the second CDS device.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

The present invention will now be described more fully with reference to the accompanying drawings, in which exemplary embodiments of the present invention are shown. The present invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

Hereinafter, a method of synchronizing a plurality of CDS devices, a CDS device, and a system according to exemplary embodiments of the present invention will be described in detail with reference to the accompanying drawings.

For convenience, a UPnP AV system, which operates based on UPnP architecture, will mainly be described in the exemplary embodiments of the present invention. Devices for implementing the present invention will be named as defined in an UPnP AV specification. However, the scope of the present invention will not be affected by the home network system or the names of the devices.

Figure 1:
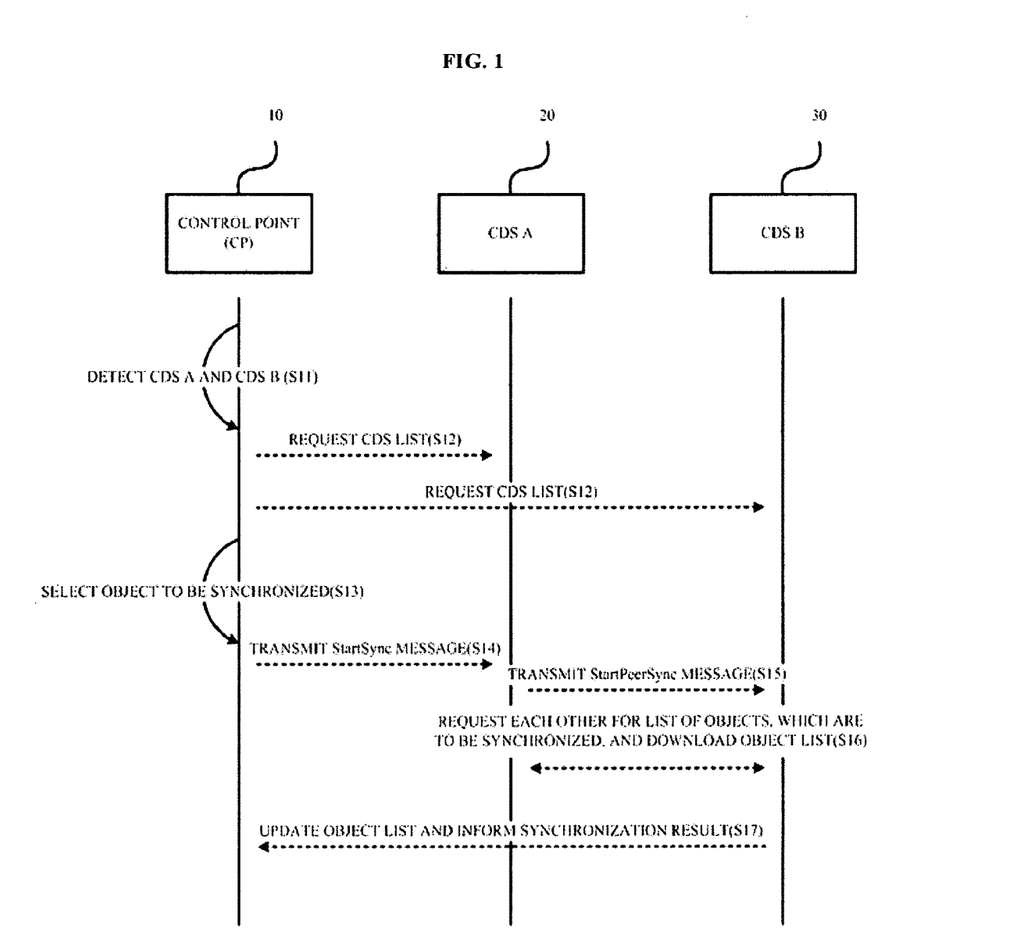
FIG. 1 illustrates a process of synchronizing two CDS devices according to an exemplary embodiment of the present invention.
Figure 2:
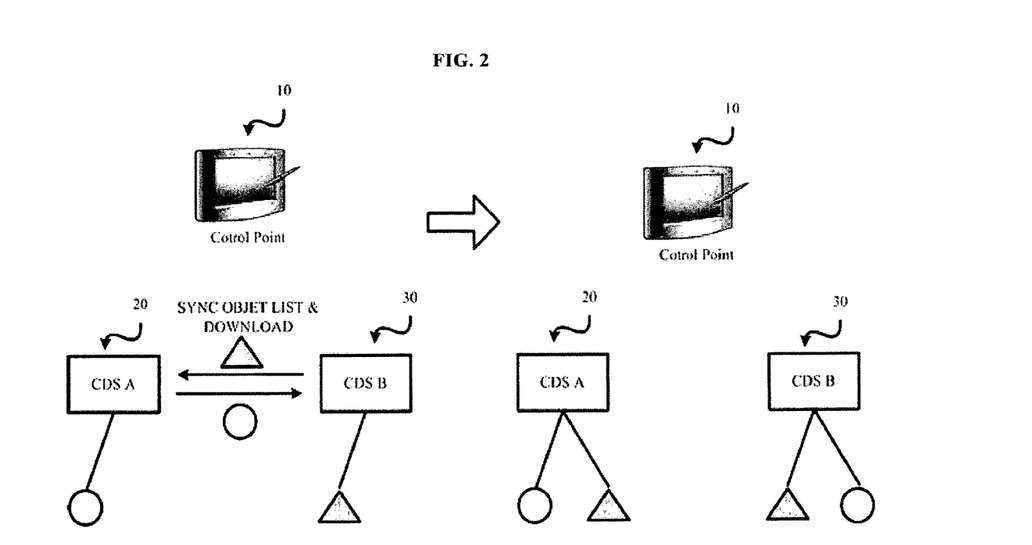
FIG. 2 illustrates the two CDS devices updated as a result of the synchronization process of FIG. 1.

FIG. 1 illustrates a process of synchronizing two CDS devices according to an exemplary embodiment of the present invention. FIG. 2 illustrates the two CDS devices updated as a result of the synchronization process of FIG. 1.

First of all, a CP 10 detects two CDS devices, i.e., CDS A 20 and CDS B 30 (operation S11), and requests each of the detected CDS A and B 20 and 30 for a CDS list (operation S12). The CP 10 selects objects, which are to be synchronized, in the CDS list received from each of the CDS A 20 and the CDS B 30 at its request (operation S13). If the CP 10 transmits a StartSync message to the CDS A 20 in order to request the CDS A 20 to start synchronization (operation S14), the CDS A 20 forwards a StartPeerSync message to the CDS B 30 in order to notify the CDS B 30 that it will start synchronization (operation S15).

In this process, synchronization between the CDS A 20 and the CDS B 30 starts. That is, the CDS A 20 and the CDS B 30 request each other for a list of objects to be synchronized and download resources and metadata based on the received object list (operation S16). Once downloading the resources and metadata, each of the CDS A 20 and the CDS B 30 updates the object list according to the downloaded resources and metadata and transmits the updated result to the CP 10 (operation S17).

The updated object list is illustrated in FIG. 2. After downloading the resources and metadata, the CDS A 20 and the CDS B 30 store the same object list, that is, circular and triangular objects. Hence, it can be understood that the CDS A 20 and the CDS B 30 are synchronized with each other.

In the exemplary embodiment of the present invention, synchronization denotes exchanging content and metadata of the content, which are retained by individual CDS devices, between the CDS devices according to a policy designated by a user. For example, if a device, such as an MP3 player, is synchronized with a home media center, multimedia content stored in the device can be enjoyed at high volume using a Hi-Fi device within a house.

If the number of CDS's, which are to be synchronized, is not two but N (N≥3), the situation becomes complicated. In the exemplary embodiment, a case where there are three CDS' s will be described as an example. However, it is obvious to those of ordinary skill in the art that the synchronization process according to the exemplary embodiment can also be applied to a case where the number of CDS's exceeds three.

Figure 3:
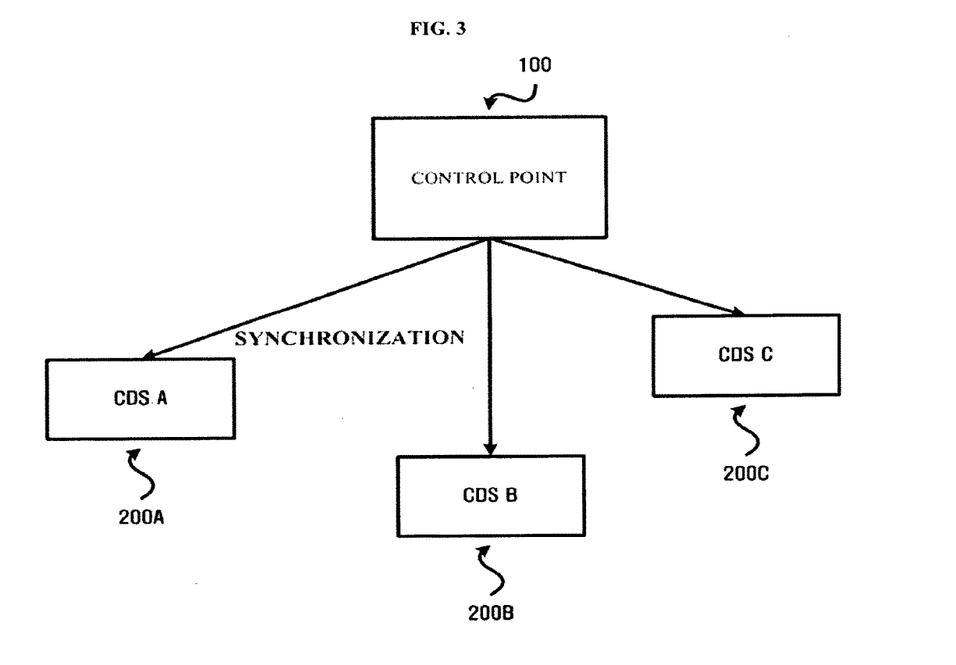
FIG. 3 illustrates a concept of synchronizing a plurality of CDS devices according to an exemplary embodiment of the present invention.

FIG. 3 illustrates a concept of synchronizing a plurality of CDS devices according to an exemplary embodiment of the present invention.

In FIG. 3, the relationship between three CDS devices, i.e., CDS A 200A, CDS B 200B and CDS C 200C, centering around a CP 100 is illustrated. The CDS A 200A through CDS C 200C are targets of synchronization, and the CP 100 issues a command to perform synchronization. Specifically, the CP 100 collects latest synchronization information of the CDS A 200A through CDS C 200C distributed over a home network, compares the collected synchronization information with previously collected synchronization information, and issues a synchronization related command to the CDS A 200A through CDS C 200C using a difference between the two pieces of information.

Figure 4:
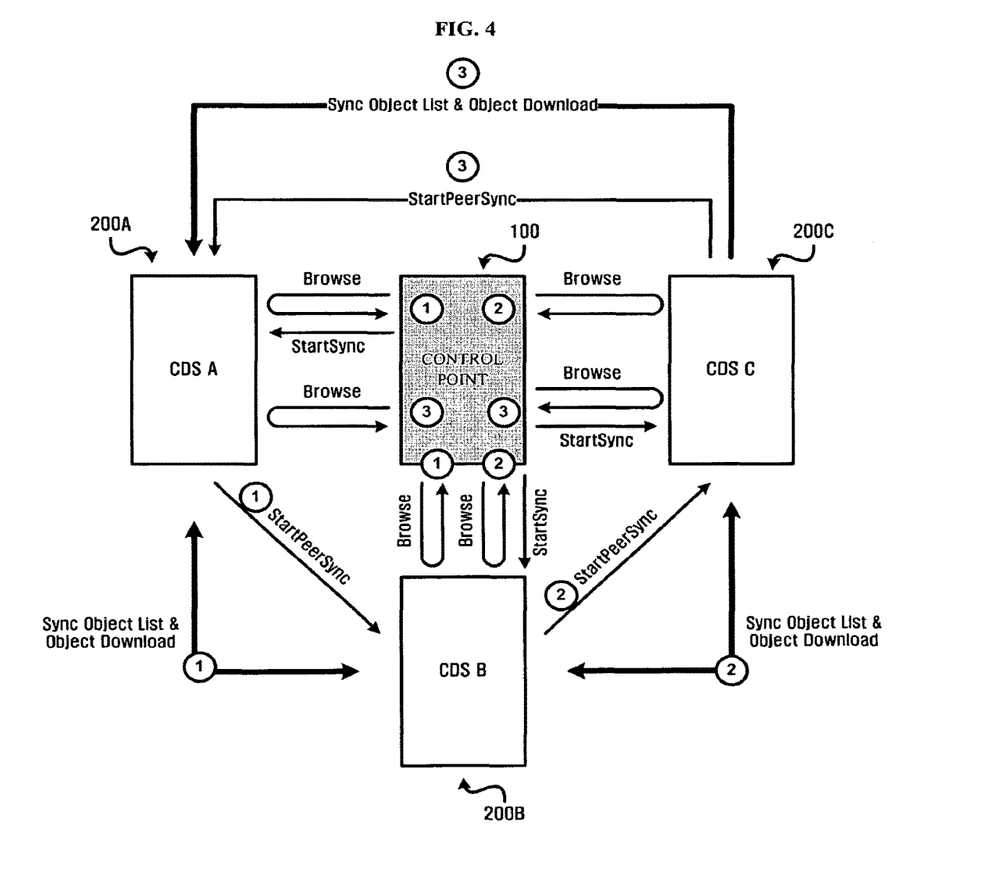
FIG. 4 is a conceptual diagram illustrating a process of synchronizing a plurality of CDS devices according to an exemplary embodiment of the present invention.

A process of synchronizing a plurality of CDS devices, such as those described above, according to an exemplary embodiment of the present invention will now be described in more detail with reference to FIG. 4. FIG. 4 is a conceptual diagram illustrating a process of synchronizing a plurality of CDS devices according to an exemplary embodiment of the present invention.

Referring to FIG. 4, a CP 100 selects two of three CDS devices, i.e., CDS A 200A, CDS B 200B and CDS C 200C, and synchronizes the selected two CDS devices. Then, the CP 100 repeatedly selects another pair of CDS devices and synchronizes the selected pair of CDS devices.

It is assumed that the CP 100 has selected and synchronized the CDS A 200A and the CDS B 200B. As in the synchronization process performed in FIGS. 1 and 2, the CP 100 detects two CDS devices, i.e., the CDS A 200A and the CDS B 200B, and requests each of the detected CDS A 200A and CDS B 200B for a CDS list. The CP 100 selects objects, which are to be synchronized, in the CDS list received from each of the CDS A 200A and the CDS B 200B at its request, and transmits a StartSync message to the CDS A 200A in order to request the CDS A 200A to start synchronization. Accordingly, the CDS A 200A forwards a StartPeerSync message to the CDS B 200B in order to notify the CDS B 200B that it will start synchronization. Then, the CDS A 200A and the CDS B 200B download resources and metadata of each other based on a list of objects to be synchronized (operation ①).

In operation ①, the CDS A 200A is synchronized with the CDS B 200B. Then, the CP 100 selects and synchronizes the CDS B 200B and the CDS C 200C in the same manner as described above (operation ②). Finally, the CP 100 selects and synchronizes the CDS C 200C and the CDS A 200A (operation ③). Detailed operations in each of operations ② and ③ is identical to those in operation ①, and thus a description thereof will be omitted.

In order to synchronize N (N≥3) CDS devices as an extension of the synchronization concept described above with reference to FIG. 4, two of the N CDS devices are selected and synchronized. Then, this process is repeated, thereby sequentially synchronizing the N CDS devices. To this end, the CP 100 should have an algorithm for selecting each pair of the CDS devices from the N CDS devices and combining the selected pair of CDS devices.

Figure 5:
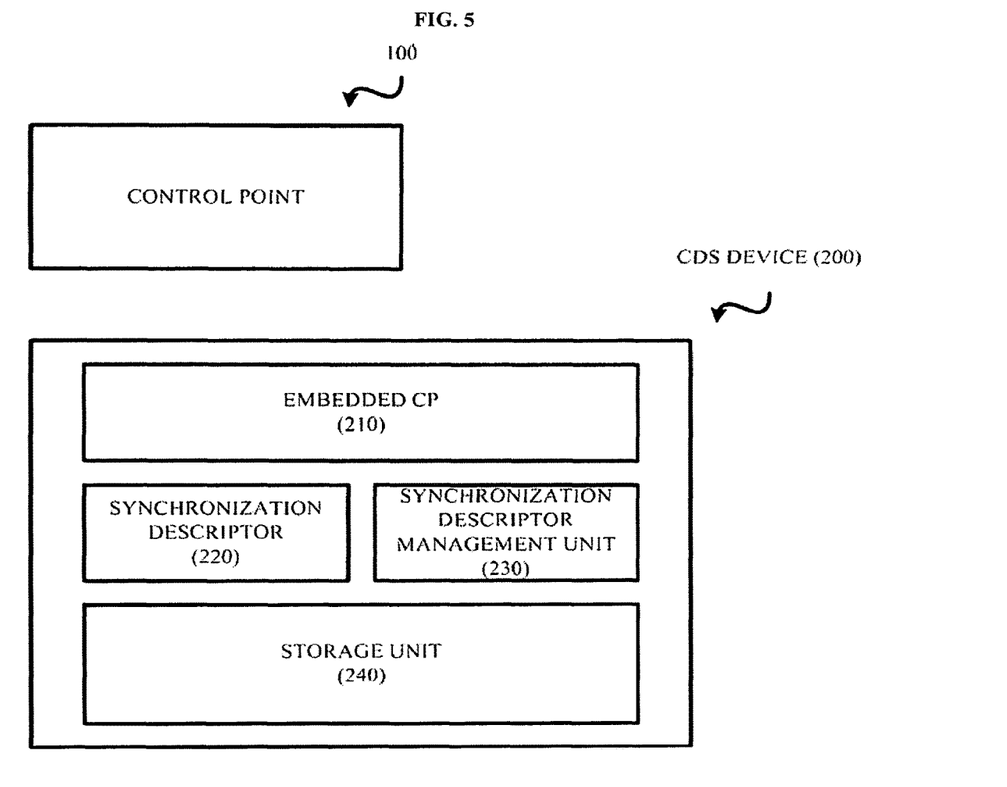
FIG. 5 is a block diagram of a system including a CP and a CDS device according to an exemplary embodiment of the present invention.

FIG. 5 is a block diagram of a system including a CP 100 and a CDS device 200 according to an exemplary embodiment of the present invention. In FIG. 5, an UPnP AV architecture system will be described as an example, and it is assumed that the UPnP AV architecture system includes N CDS devices and a CP. In addition to the CP and the N CDS devices, the UPnP AV architecture system includes a media server having the N CDS devices and a media renderer rendering and executing multimedia content stored in the media server.

Referring to FIG. 5, the CP 100 supports synchronization of the N CDS devices, which are included in the UPnP AV system and provide multimedia content, and controls the N CDS devices that will be synchronized. In addition, the CP 100 controls devices included in the UPnP AV system, such as the media server or the media renderer, to render the multimedia content.

The CDS device 200 controlled by the CP 100 includes an embedded CP 210, a synchronization descriptor 220, a synchronization descriptor management unit 230, and a storage unit 240.

The embedded CP 210 exchanges synchronization information with another CDS device.

The synchronization descriptor 220 contains the synchronization information for synchronization with a target CDS device. The synchronization information includes identification (ID) information of an object, which is to be synchronized, included in the CDS device 200, information regarding changes in the object, and information regarding a synchronization policy. In addition, the synchronization information includes information regarding a list of objects that are to be synchronized. The synchronization information may be changed as the object changes, i.e., is generated, modified, or deleted. The object to be synchronized includes an item corresponding to a multimedia file and a container containing the item.

The synchronization descriptor management unit 230 manages the synchronization descriptor 220. For example, the synchronization descriptor management unit 230 allows the synchronization descriptor 220 to be shared with another CDS device in order for synchronization with the CDS device.

The storage unit 240 obtains and stores information regarding changes in the synchronization information using the shared synchronization descriptor 220. In this case, the embedded CP 210 performs synchronization using the information regarding the changes in the synchronization information. Advantages of performing synchronization using the information regarding the changes in the synchronization information are as follows.

In an initial synchronization operation, all synchronization information including object lists of other CDS devices should be collected and compared. However, once the initial synchronization operation is performed, subsequent synchronization operations can be performed by updating changes in the synchronization information, which occurred in previous synchronization operations. Therefore, network resources can be efficiently utilized.

Figure 6:
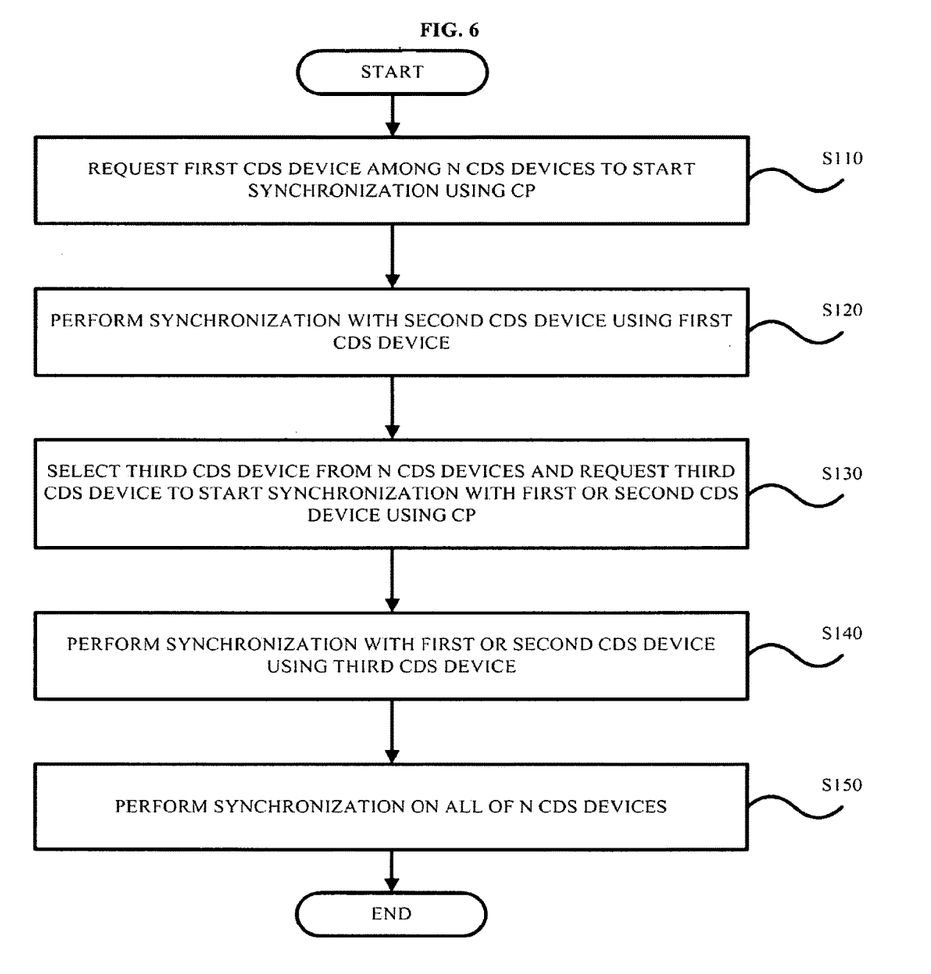
FIG. 6 is a flowchart illustrating a method of synchronizing a plurality of CDS devices according to an exemplary embodiment of the present invention.

FIG. 6 is a flowchart illustrating a method of synchronizing a plurality of CDS devices according to an exemplary embodiment of the present invention.

Referring to FIG. 6, a CP requests a first CDS device among N CDS devices of a home network to start synchronization (operation S110). In this case, the CP 100 may request the first CDS device to generate a synchronization descriptor describing synchronization information between the first CDS device and a second CDS device. In response to the request, the first CDS device generates the synchronization descriptor, and the first and the second CDS devices share the synchronization descriptor.

The synchronization descriptor includes the synchronization information, and the synchronization information includes ID information of an object to be synchronized, information regarding changes in the object, and information regarding a synchronization policy.

After the synchronization descriptor is shared, the first CDS device performs synchronization with the second CDS device in earnest (operation S120). Specifically, for the synchronization, the shared synchronization descriptor is compared with a previously shared synchronization descriptor. That is, the synchronization is performed by obtaining changes in the synchronization information instead of inefficiently retrieving and comparing all information regarding objects to be synchronized.

After the synchronization is performed using the above method, the first and the second CDS devices exchange messages with each other to inform the completion of synchronization. Accordingly, the completion of synchronization is reflected in the synchronization descriptor, and thus the synchronization descriptor is updated.

After the two of the N CDS devices have been synchronized, the CP selects another CDS device from the N CDS devices of the home network and requests the selected CDS device to start synchronization with the first or the second CDS device (operation S130).

The requested CDS device performs the synchronization with the first or the second CDS device using the same method as described above (operation S140). Further, synchronization is performed on all of the N CDS devices (operation S150).

It is obvious to those of ordinary skill in the art that the scope of an apparatus for synchronizing a plurality of CDS devices according to the exemplary embodiments of the present invention extends to a computer-readable recording medium on which a program code for executing the above method using a computer is recorded.

As described above, the exemplary embodiments of the present invention provides at least one of the following advantages.

Since a plurality of CDS devices are synchronized with each other, the convenience of a home network user can be enhanced.

In addition, an embedded CP of a CDS device performs synchronization using information regarding changes in synchronization information. Therefore, once an initial synchronization operation is formed, subsequent synchronization operations can be performed without a CP. That is, CP-independent synchronization is possible.

Furthermore, the present invention can secure increased synchronization speed over related art UPnP technology and can perform synchronization using the related art UPnP technology.

However, the effects of the exemplary embodiments of the present invention are not restricted to the one set forth herein. The above and other effects of the exemplary embodiments of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the exemplary embodiments of the present invention but by the appended claims, and all differences within the scope will be construed as being included in the present invention.

What is claimed is:

1. A device which is connected to a network, the device comprising:
    a memory configured to store instructions; and a processor configured to execute the stored instructions to implement:
    a synchronization descriptor which comprises synchronization information for synchronization with another device;
    a synchronization descriptor management unit which manages the synchronization descriptor; and
    a communication unit which, in response to receiving a signal indicating that it is selected as a synchronization target from a control point, transmits the synchronization descriptor to the other device on the network, and receives, from the other device, a synchronization descriptor of the other device connected to the network, wherein objects to be synchronized between the device and the other device are selected by the control point according to a first list received from the device and a second list received from the other device, wherein the communication unit transmits the first list and receives the second list, and wherein the communication unit downloads resources and metadata of the other device based on the second list and the device updates the first list based on the resources and metadata.

2. The device of claim 1, further comprising an embedded control point which performs synchronization with the other device on the network using the received synchronization descriptor.

3. The device of claim 1, wherein the synchronization descriptor comprises at least one from among identification information of an object to be synchronized, information regarding changes in the object, and a synchronization policy.

* * * * *